(12) United States Patent
Stevanovic et al.

(10) Patent No.: US 6,893,145 B2
(45) Date of Patent: May 17, 2005

(54) LIGHT SYSTEM

(75) Inventors: Ljubisa Dragoljub Stevanovic, Montreal (CA); Eugene George Olczak, Glenville, NY (US); Frank Jacob John Mueller, Scotia, NY (US); Dietmar Karl Sundermann, Fontenay-les-Briis (FR)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/784,486

(22) Filed: Feb. 20, 2004

(65) Prior Publication Data

US 2004/0165701 A1 Aug. 26, 2004

Related U.S. Application Data

(62) Division of application No. 09/683,895, filed on Feb. 28, 2002, now Pat. No. 6,779,920.

(51) Int. Cl.[7] .............................................. F21S 13/14
(52) U.S. Cl. ...................... 362/257; 362/302; 362/303; 362/350
(58) Field of Search ................................ 362/257, 296, 362/297, 298, 307, 311, 308, 304, 305, 327, 328, 347, 350, 302, 303; 378/206, 205

(56) References Cited

U.S. PATENT DOCUMENTS 2,955,205 A    10/1960  Camfferman
3,851,165 A  * 11/1974  Beck et al. .................. 362/268
4,167,675 A    9/1979   Stodberg et al.
4,502,147 A    2/1985   Michaels
4,521,905 A    6/1985   Hosokawa
4,891,739 A  * 1/1990   Yasuda ........................ 362/296

OTHER PUBLICATIONS

U.S. Patent 4,979,203 Iss. by Suckewer, et al, 378/206, cited by Examiner in the Parent Case 09/683,895 on Form PTO–892.

* cited by examiner

Primary Examiner—Sandra O'Shea
Assistant Examiner—Sharon Payne
(74) Attorney, Agent, or Firm—Ann M. Agosti; Patrick K. Patnode

(57) ABSTRACT

An X-ray localizer light system comprises: a long life X-ray localizer light source; an optical concentrator, the light source being situated at a first focal spot, the optical concentrator being configured for concentrating X-ray localizer light from the light source to a second focal spot; and an opaque shield having an aperture therein situated proximate to the second focal spot and being of such a geometrical shape so as to maximize light throughput while meeting light field edge contrast requirements. In another light system, the optical concentrator comprises a reflector comprising a quasi-ellipsoidal portion within which the light source is situated, a cylindrical portion situated between the quasi-ellipsoidal portion and the shield for reflecting stray light, a back reflector portion situated proximate to the shield, and a centrally-mounted portion situated between the aperture and the light source for directing back-reflected light in the direction of the aperture.

10 Claims, 4 Drawing Sheets

LIGHT SYSTEM

This application is a Divisional of Ser. No. 09/683,985 filed Feb. 28, 2002 now U.S. Pat. No. 6,779,920.

BACKGROUND OF INVENTION

The invention relates generally to X-ray localizer light for visual marking of a target area to be exposed to X-rays.

An X-ray system typically includes a collimator for establishing an exposure area to the X-rays. The collimator typically includes two pairs of blades made of X-ray absorbing material, such as lead, which can be opened and closed to establish the X-ray exposure area. Because the X-ray beam is not visible to the eye, an X-ray localizer light system is typically provided for supplying visible light from a lamp to visually indicate the exposure area. To accurately represent the area of X-ray exposure at all distances from the collimator, the light and X-ray sources are positioned at substantially the same respective distances to at least three points on a flat optical mirror which are not in a straight line and which cause the visible light to be coincident with the X-rays. Thus, the light source does not have to be in the path of the X-ray beam.

Precise alignment of the distance to the light source and the angle of the mirror are important to achieve coincidence of edges of the visible light and X-ray exposure areas. The primary challenge with conventional approaches has been adequate illumination with satisfactory edge contrast associated with the collimator blades.

Low voltage quartz-halogen projector lamps with high filament temperatures have been used. Such projector lamps have relatively small filament size and high lumen output (e.g., 5000 lumens), offering adequate edge contrast and illumination at the target area. These projector lamps typically also withstand repetitive on/off switching and cost significantly less than high intensity discharge (HID) lamps. However, due to the inherent tradeoff between lumen output and filament life in halogen lamps, these projector lamps typically have very short life (about 300 burn hours or less).

In X-ray collimator applications, lamp replacement involves precise optical alignment and is a task performed by a qualified service technician. The more frequently that a lamp needs to be replaced, the higher the incidence of down-time and labor costs.

It would therefore be desirable to improve localizer lamp life in X-ray collimator applications while maintaining or exceeding conventional performance characteristics of localizer light systems.

SUMMARY OF INVENTION

Briefly, in accordance with one embodiment of the present invention, an X-ray localizer light system comprises: a long life X-ray localizer light source; an optical concentrator, the light source being situated at a first focal spot, the optical concentrator being configured for concentrating X-ray localizer light from the light source to a second focal spot; and an opaque shield having an aperture therein, the aperture being situated proximate to the second focal spot and being of such a geometrical shape so as to maximize light throughput while meeting light field edge contrast requirements of the X-ray localizer system.

In accordance with another embodiment of the present invention, a light system comprises: a light source; a reflector having first and second focal spots, the light source being situated at the first focal spot, the reflector being configured for concentrating X-ray localizer light from the light source to the second focal spot; an opaque shield having an aperture therein, the aperture being situated proximate to the second focal spot, wherein the reflector comprises a quasi-ellipsoidal portion, wherein the light source is situated within the quasi-ellipsoidal portion, a cylindrical portion situated between the quasi-ellipsoidal portion and the shield for reflecting stray light from the quasi-ellipsoidal portion in the direction of the shield, a back reflector portion situated proximate to the shield, and a centrally-mounted portion situated between the aperture and the light source for directing back-reflected light in the direction of the aperture.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
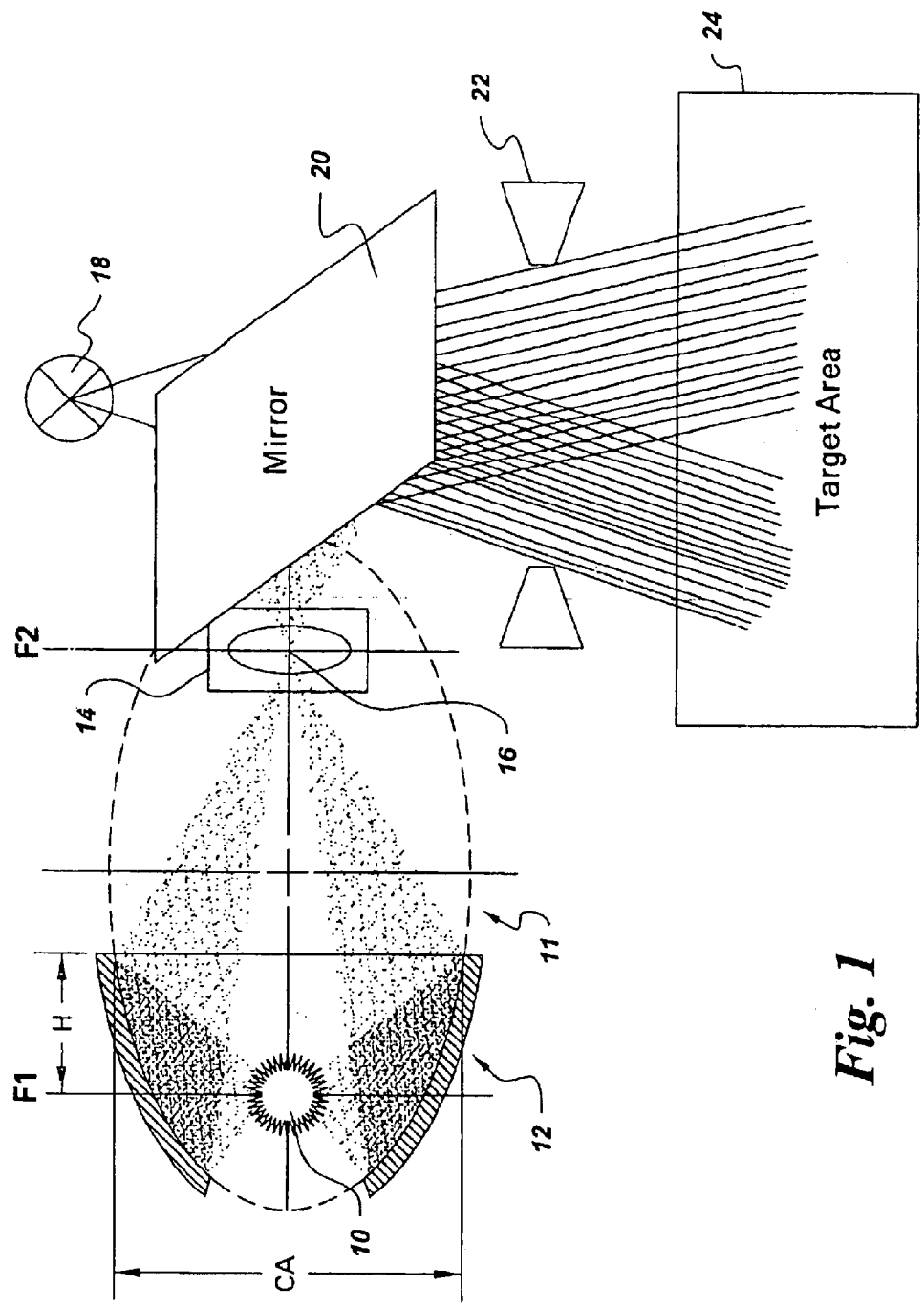
FIG. 1 is schematic diagram of an X-ray localizer light system in accordance with one embodiment of the present invention.

FIG. 1 is schematic diagram of an X-ray localizer (visualization) light system 1. In accordance with one embodiment of the present invention an X-ray localizer light system comprises: a long life X-ray localizer light source 10; an optical concentrator 11, light source 10 being situated at a first focal spot F1, optical concentrator 11 being configured for concentrating X-ray localizer light from light source 10 to a second focal spot F2; and an opaque shield 14 having an aperture 16 therein, aperture 16 being situated proximate to second focal spot F2 and being of such a geometrical shape so as to maximize light throughput while meeting light field edge contrast requirements of X-ray localizer light system 1. In a typical X-ray environment, such as a medical system or an industrial system X-ray environment, for example, X-ray source 18 directs X-rays through collimator 22 to a target area 24. One or more mirrors 20 are typically used to direct the light from X-ray localizer light system 1 to target area 24.

Figure 2:
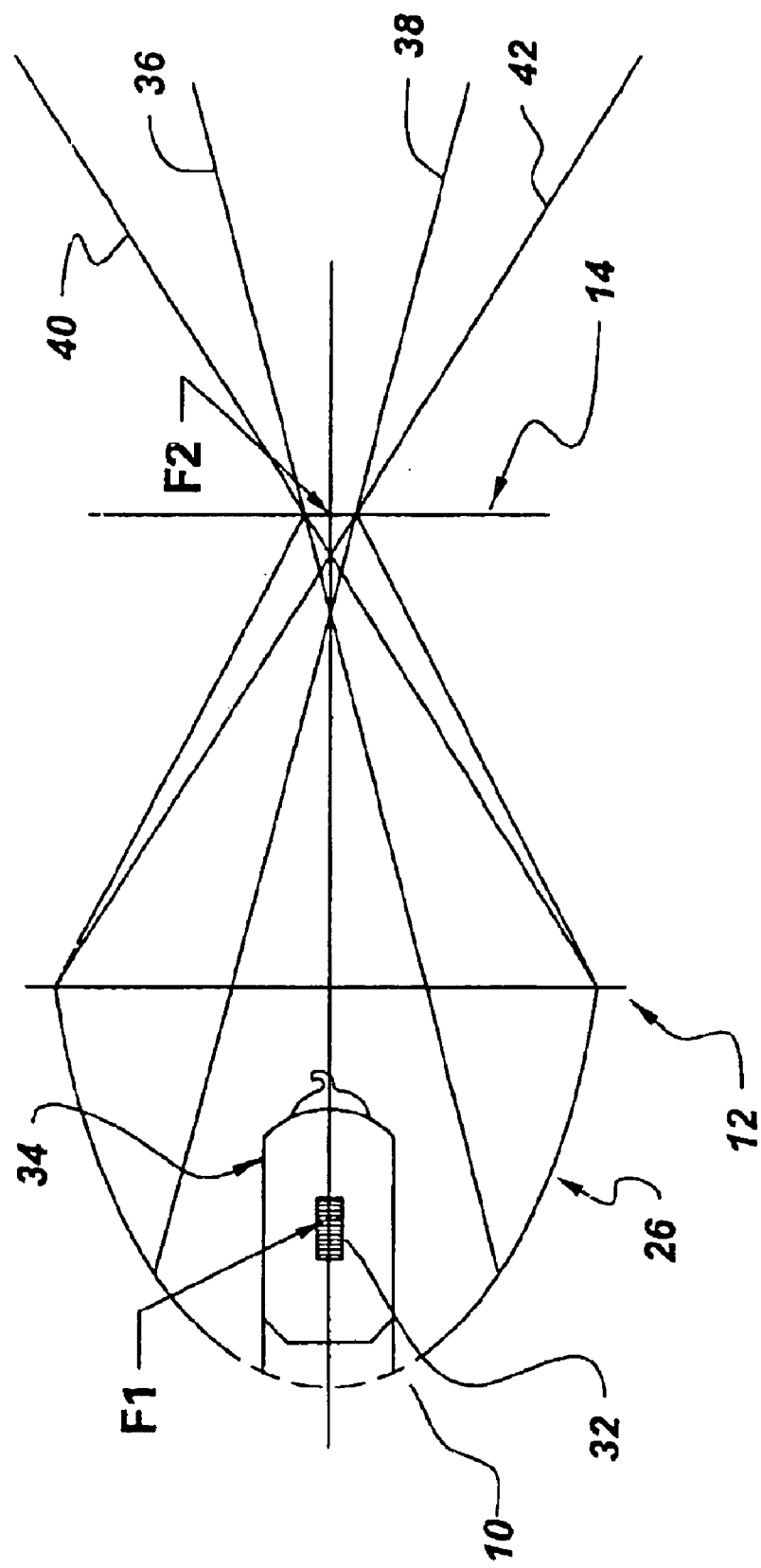
FIG. 2 is a sectional side view of the X-ray localizer light system of FIG. 1 in accordance with another more specific embodiment of the present invention.

FIG. 2 is a sectional side view of a more specific embodiment of the X-ray localizer light system of FIG. 1. Typically light source 10 includes a light emitting element 32 surrounded by a light bulb 34. Because light emitting element 32 (typically a filament, for example) is bright and close to light bulb 34, light emitting from element 32 cannot be separated from light bulb 34 that surrounds it. Light element 32 radiates in all directions, while reflector 12 concentrates the light to counteract the spreading. The concentration efficiency of the reflector to the second focal spot depends upon the design of the reflector as well as the aperture and ranges from about five to about eighty percent of the total light.

Second focal spot F2 is an enlarged representation of light source 10. The distance of shield 14 and thus aperture 16 from light source 10 can be within a range and need not place aperture 16 exactly at the position of second focal spot F2. As used herein "proximate to the second focal spot" is meant to include exactly at second focal spot F2, or within about plus or minus twenty percent of the distance between first and second focal spots F1 and F2 of second focal spot F2. The specific location will vary according to the goals of a system design. If aperture 16 is closer to light source 10 than second focal spot F2, a wider cone angle will occur past aperture 16. If aperture 16 is farther from light source 10 than second focal spot F2, a smaller cone angle will occur past aperture 16. The smaller cone angle has less total light than the larger cone angle but results in more intense light at the target area (that is, higher luminosity). A cone angle is shown in FIG. 2, for example, by lines 40 and 42 which are outer portions of an angle representing a total light field, and by lines 36 and 38 which are outer portions of an angle within the total light field representing a desired light field.

When selecting the size of aperture 16, a balance occurs between edge contrast and light throughput. By shrinking the size of aperture 16, the edge contrast is increased at the expense of light throughput. Conversely, by increasing the size of aperture 16, edge contrast is decreased and light throughput is improved. Typically, in medical applications, edge contrast requirements are about 4.5 to about 1 over a distance (of about 6 mm) across the edge with a 1 mm slit or resolution. Edge contrast is measured with a light meter at the bright area which is then moved into the dark area to obtain the bright/dark ratio in luminosity.

In one embodiment of the present invention, light source 10 comprises a halogen lamp optimized for long life. Because of inherent tradeoff, halogen lamps with long rated life have significantly lower luminous efficacy than quartz-halogen projector lamps (as much as about 50%). By using the long life halogen lamp in conjunction with other aspects of the present invention to overcome the lower luminous efficacy, sufficient luminosity can be provided to target area 24.

Figure 5:
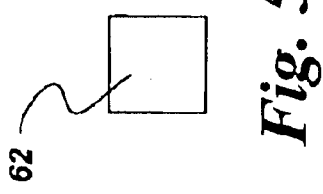
FIGS. 5 and 6 illustrate aperture shapes for use in several more specific embodiments of the present invention.
Figure 6:
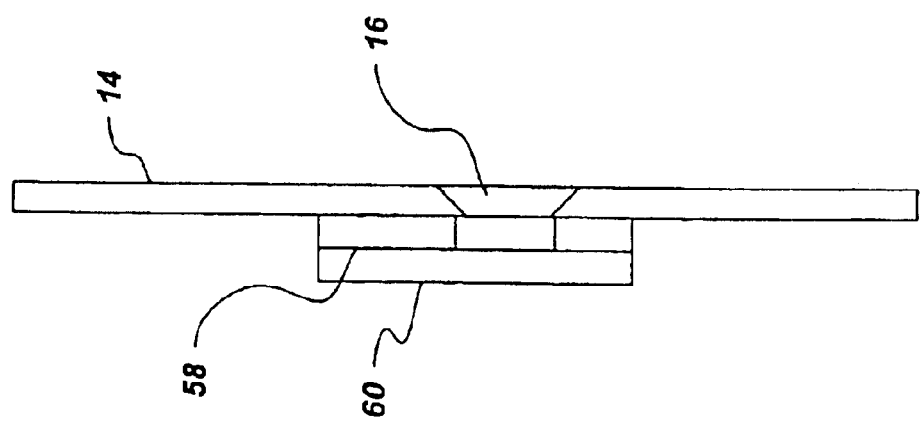

In a more specific embodiment, the halogen lamp comprises an axially positioned filament coil (shown in FIG. 2 as light emitting element 32), and each dimension of the coil is smaller than a corresponding dimension of aperture 16. For example, coils typically have a length and a diameter. If aperture 16 is a square shape (as shown by aperture 62 of FIG. 5, for example), both the length and the diameter of the filament coil are selected to be smaller than the side of the square. If aperture 16 is a circle shape (as shown by aperture 64 of FIG. 6, for example), both the length and the diameter of the filament coil are selected to be smaller than the diameter of the circle. In an even more specific embodiment which has been found to reduce off-axis geometrical errors (due to small filament sizes), the filament coil is wound in a helix having a length and a diameter, and the length of the helix is equal to or less than about twice the diameter of the helix.

Another useful parameter when selecting light source 10 is robustness. As used herein, "robust" means sufficiently capable of withstanding repetitive operation in the intended environment. In the medical X-ray machine environment, for example, a light source is often cyclically turned on for about 60 seconds to about 90 seconds and then turned off for about 60 seconds.

Still another useful parameter when selecting light source 10 is the restart voltage. Halogen lamps, for example, have substantially similar (meaning identical or within plus or minus about 10 percent of each other) restart and operation voltages. This property is an advantage as compared with light sources requiring higher restart voltages than operational voltages such as HID lamps. In one embodiment, light source 10 has a restart voltage equal to or less than about 48 volts. In a more specific embodiment, the restart voltage is equal to or less than about 12 volts. When a halogen lamp is used, the power level is typically in a range of about 35 watts to about 150 watts with the optimal value depending upon the filament size and the lumen output.

Yet another useful parameter when selecting light source 10 is compactness. In a light emitting context, "compact" means that light emitting element 32 is sufficiently small so that the light from reflector 12 can be directed at aperture 16. In one embodiment, a filament coil is wound in a helix having a length of about 3.5 mm and a diameter of about 1.7 mm. In a size context, "compact" means that the light source size does not result in a need for a larger size of the light system assembly as compared with present light system assemblies. In one example, light bulb 34 is selected to have dimensions with each being about 10 millimeters or less. In a more specific example, light bulb 34 comprises a cylindrical shape having a diameter of about 1 cm and a length of about 1.3 cm.

Optical concentrator 11 is configured for concentrating X-ray localizer light from light source 10 to second focal spot F2 with aperture 16 being situated proximate to second focal spot F2 and becoming a virtual light source aligned to the X-ray source. Optical concentrator 11 may comprise one or more lenses (not shown), one or more reflectors, or combinations thereof, for example.

In one embodiment, optical concentrator 11 comprises a reflector 12 (meaning at least one reflector 12). In a more specific embodiment, light source 10, reflector 12, and shield 14 are configured to concentrate about 10 percent of total light emitted by the light source 10 through aperture 16. The most intense region of the light about focal spot F2 is typically no more than about 5 millimeters (mm) in diameter, so aperture size of about 4 to 5 mm represents the best tradeoff between light throughput and edge contrast.

Reflector 12 typically is a smooth surface reflector comprising a thermally conductive material coated by dichroic mirror material. Examples of appropriate thermally conductive materials include glass and aluminum. Dichroic mirror coatings are useful for reflecting visible light and transmitting heat.

In one embodiment, reflector 12 comprises a quasi-ellipsoidal portion 26, and light source 10 is situated within quasi-ellipsoidal portion 26. In a more specific embodiment, light source 10 is attached to reflector 12 with light emitting element 32 centered about first focal spot F1. Quasi-ellipsoidal portion 26 may comprise an elliptical shape or a shape altered from a pure ellipse to improve concentration of light through aperture 16 (in other words, a shape designed to follow a certain curvature). Custom optimization (to accommodate the light source 10 which is not a point source) is readily accomplished via commercially available software tools. In one embodiment, for example, the length (H in FIG. 1) of quasi-ellipsoidal portion 26 is in the range of about 40 mm to about 60 mm, the inner diameter of the quasi-ellipsoidal portion (CA in FIG. 1) ranges from about 45 mm to about 55 mm, and the distance between focal spots F1 and F2 ranges from about 54 mm to about 58 mm.

Figure 4:
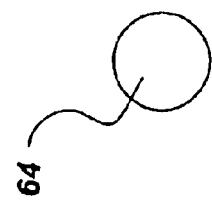
FIG. 4 is sectional side view of a more specific embodiment of a diffuser and shield arrangement for use in another more specific embodiment of the present invention.

Shield 14 may comprise any structurally suitable opaque material. Mechanically rigid materials that can withstand operating temperatures are particularly useful. In one embodiment, for example, shield 14 comprises aluminum. Although larger thicknesses can be used, a typical example range of shield thicknesses is about 0.5 mm to about 2 mm. Aperture 16 may comprise any polygonal shape. As used herein, a "polygonal" aperture may include an aperture having corners (of any degree) or an aperture having a continuous shape (infinite sides) such as a round or oblong shape. For X-ray system embodiments wherein collimator 22 (shown in FIG. 1) has a square opening, a square aperture is useful for increasing light intensity at the target area without reducing edge contrast. Typically, it is useful to have aperture 16 with a smaller opening facing optical concentrator 11 and a larger opening facing away from optical concentrator 11 as shown in FIG. 4.

Due to fact that more light reaches aperture 16 from reflector 12 than directly from light source 10, the light field emanating from aperture 16 is typically darkest in the central region. One way the center can be made brighter is to diffuse some of the surrounding light into the center with an appropriate grade diffuser 60 (shown in FIG. 4) situated between light source 10 and aperture 16.

Positioning diffuser 60 close to aperture 16 is particularly useful for improving uniformity of light field at target area 24 (shown in FIG. 1). In one embodiment, for example, diffuser 60 is attached directly to shield 14. In a more specific embodiment, an adhesive 58 such as a high temperature RTV (room temperature vulcanizing) silicone rubber material is used to maintain the attachment of diffuser 60 to shield 14.

Several examples of useful materials for diffuser 60 include foggy glass and patterned glass. In either of these embodiments, the diffuser is designed to disperse light across a predetermined range of angles. In medical systems, for example, narrow dispersion angles in the range of about twenty degrees or less are typically useful for maximizing useful light throughput. In one embodiment, the diffuser is square with a side of about 1 cm long and has a thickness of about 0.2 cm.

The specific embodiments discussed herein can be used in various combinations to optimize the needs for a particular light system. In one example embodiment, an X-ray localizer light system comprises: a long life halogen lamp 10; a reflector 12 having first and second focal spots, the lamp being situated at first focal spot F1, reflector 12 being configured for concentrating light from the lamp to second focal spot F2; an opaque shield 14 having an aperture 16 therein, aperture 16 being situated proximate to second focal spot F2 and being of such a geometrical shape so as to maximize light throughput while meeting light field edge contrast requirements of the X-ray localizer system; and a diffuser 60 situated between lamp 10 and aperture 16, wherein the halogen lamp comprises an axially positioned filament coil and wherein each dimension of the coil is smaller than a corresponding dimension of aperture 16.

Figure 3:
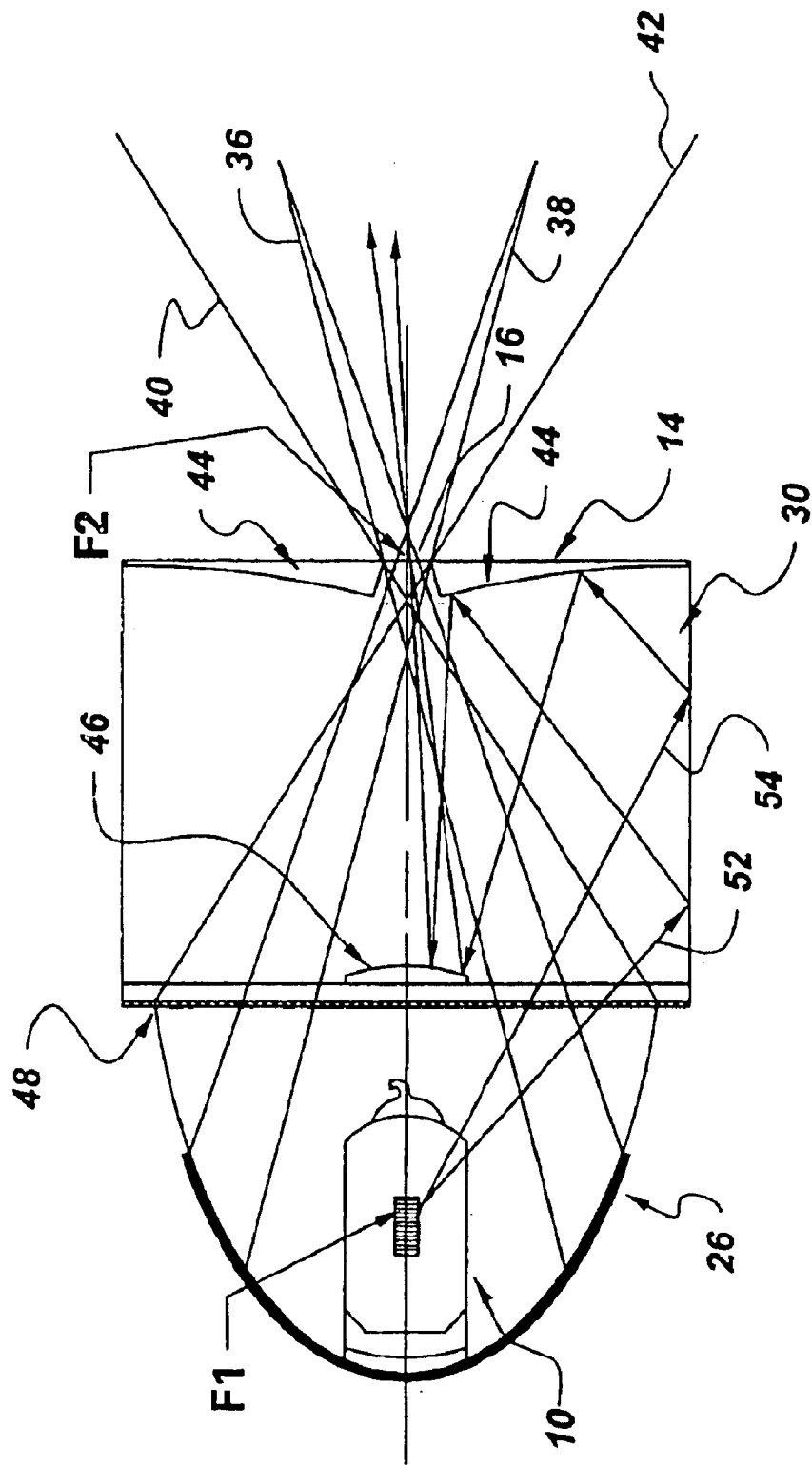
FIG. 3 is a sectional side view of a light system in accordance with another embodiment of the present invention.

FIG. 3 is a sectional side view of a light system in accordance with another embodiment of the present invention. The embodiment of FIG. 3 is useful in the context of X-ray localizer light systems for increasing brightness in the central region of the light field emanating from aperture 16 (either in combination with or separately from the diffuser embodiment) but is not intended to be limited to the context of X-ray localizer light systems. In the embodiment of FIG. 3, reflector 12 additionally comprises a cylindrical portion 30 situated between quasi-ellipsoidal portion 26 and shield 14 for reflecting stray light from the quasi-ellipsoidal portion in the direction of the shield 14, a back reflector portion 44 situated proximate to shield 14, and a centrally-mounted portion 46 situated between the aperture and the light source for directing back-reflected light in the direction of aperture 16. Proximate to shield 14 means that the back reflector portion is situated on shield 14 or within about 2.5 millimeters from shield 14. Using the embodiment of FIG. 3, part of the light from beyond the quasi-ellipsoidal portion is reflected back toward the end of the light source and then in the direction of the aperture to yield more light to the center portion.

In one embodiment, a transparent cover 48 (comprising a material such as glass, for example) is present between quasi-ellipsoidal portion 26 and cylindrical portion 30, and centrally-mounted portion 46 is attached directly to transparent cover 48. Back reflector portion 44 and centrally-mounted portion 46 are shaped so as to maximize reflection of stray light in the direction of aperture 16. In one embodiment, back reflector portion 44 comprises an elliptically curved surface. Several examples of back-reflected light are shown by light paths 52 and 54 of FIG. 3. Using the embodiment of FIG. 3, the light field from aperture 16 becomes more uniform.

The description above with respect to the light source, reflector, shield, aperture, and diffuser embodiments of FIGS. 1–2 and 4–6 is equally applicable to the embodiment of FIG. 3.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A light system comprising:

a light source;

a reflector having first and second focal spots, the light source being situated at the first focal spot, the reflector being configured for concentrating light from the light source to the second focal spot;

an opaque shield having an aperture therein, the aperture being situated proximate to the second focal spot, wherein the reflector comprises a quasi-ellipsoidal portion, wherein the light source is situated within the quasi-ellipsoidal portion, a cylindrical portion situated between the quasi-ellipsoidal portion and the shield for reflecting stray light from the quasi-ellipsoidal portion in the direction of the shield, a back reflector portion situated proximate to the shield, and a centrally-mounted portion situated between the aperture and the light source for directing back-reflected light in the direction of the aperture.

2. The system of claim 1 wherein the light source comprises a halogen lamp.

3. The system of claim 2 wherein the halogen lamp comprises an axially positioned filament coil and wherein each dimension of the coil is smaller than a corresponding dimension of the aperture.

4. The system of claim 3 wherein the filament coil is wound in a helix having a length and a diameter, and wherein the length of the helix is equal to or less than about twice the diameter of the helix.

5. The system of claim 1 wherein the quasi-ellipsoidal portion comprises an elliptical portion.

6. The system of claim 1 wherein the reflector comprises a thermally conductive material coated by dichroic mirror material.

7. The system of claim 1 wherein the shield comprises aluminum.

8. The system of claim 1 wherein the aperture comprises a polygonal aperture.

9. The system of claim 1 further comprising a diffuser situated between the light source and the aperture.

10. The system of claim 9 wherein the diffuser is attached to the shield.

* * * * *